(No Model.)
T. JEFFERSON.
BICYCLE SUPPORT.
No. 578,241. Patented Mar. 2, 1897.
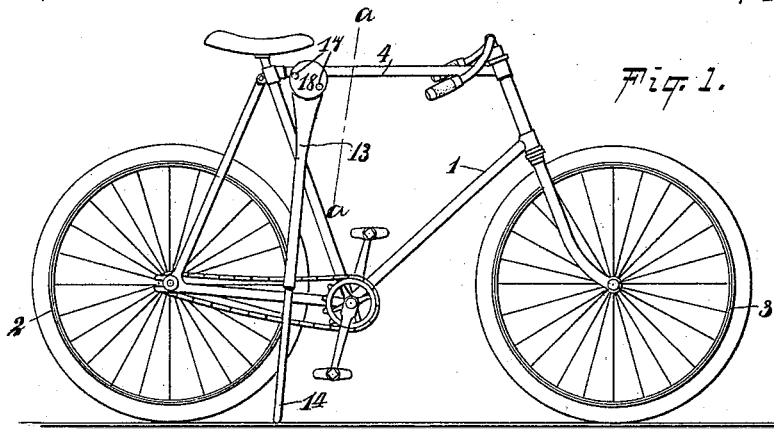
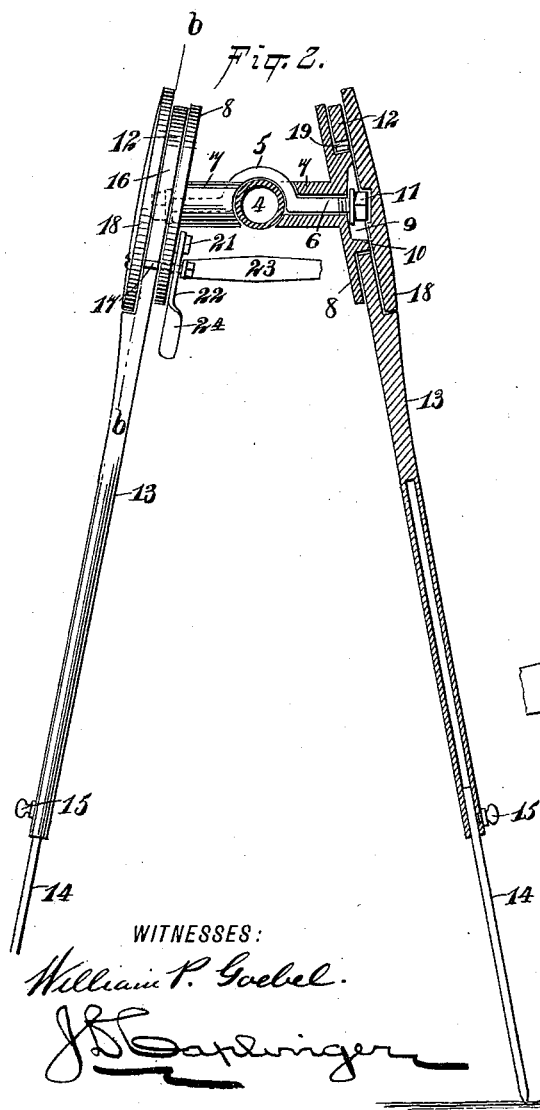
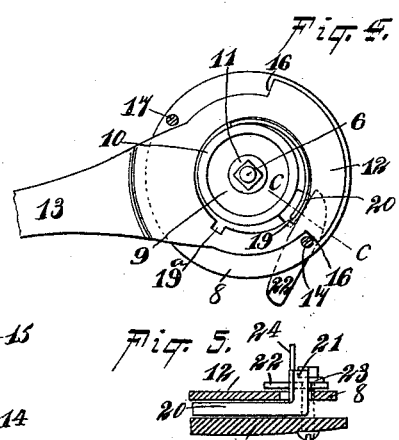
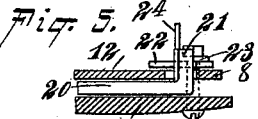
WITNESSES:
William P. Goebel.
J. H. Oatlinger
INVENTOR
T. Jefferson.
BY
ATTORNEYS.

UNITED STATES PATENT OFFICE.

THOMAS JEFFERSON, OF SPEARFISH, SOUTH DAKOTA.

BICYCLE-SUPPORT.

SPECIFICATION forming part of Letters Patent No. 578,241, dated March 2, 1897.

Application filed March 24, 1896. Serial No. 584,594. (No model.)

*To all whom it may concern:*

Be it known that I, THOMAS JEFFERSON, of Spearfish, in the county of Lawrence and State of South Dakota, have invented a new and Improved Bicycle-Support, of which the following is a full, clear, and exact description.

This invention relates to certain improvements in bicycle-supports such as are adapted to be carried on the frame of a vehicle in position to be swung downwardly so as to engage the ground at the sides of the frame in such a way as to hold the bicycle in an erect position when not in use; and the object of the invention is to provide a device of this character of a simple and inexpensive nature which shall be light and strong and shall be capable of ready operation to raise and lower the supporting-arm out of and into operative position and to hold the arm in position when raised or lowered.

The invention consists in a support comprising a cross-bar having its central portion provided with means for engaging the bicycle-frame, casings held on the ends of the cross-bar, and arms pivotally mounted in said casings and adapted to be raised and lowered, said casings being provided with locking devices to hold the arms in raised and lowered positions.

The invention also contemplates certain novel features of the construction, combination, and arrangement of the various parts of the improved support whereby certain important advantages are attained, and the device is made simpler, cheaper, and otherwise better adapted and more convenient for use than various other similar supports heretofore employed, all as will be hereinafter fully set forth. The novel features of the invention will be carefully pointed out in the appended claims.

Reference is to be had to the accompanying drawings, forming a part of this specification, in which similar characters of reference indicate corresponding parts in all the views.

Figure 1 is a side elevation showing a bicycle provided with a support constructed in accordance with my invention. Fig. 2 is an enlarged sectional view taken in the plane indicated by the line *a a* in Fig. 1, showing the construction of the improved support, the left-hand side of the device being shown in elevation. Fig. 3 is a sectional view through the casing at one side of the support in the plane indicated by the line *b b* in Fig. 2, the supporting-arm being shown in a lowered position. Fig. 4 is a view similar to Fig. 3, but showing the supporting-arm in a raised position; and Fig. 5 is a sectional view taken in the plane indicated by the line *c c* in Fig. 4, showing the locking device for holding the arm in adjusted position.

In the views, 1 indicates the frame of a bicycle having a rear driving-wheel 2 and a steering-wheel 3 in the ordinary way, the frame being provided with the usual saddle and pedal-shaft geared to the rear wheel. On the top brace-bar 4 of the frame, just forward of the saddle, is arranged a cross-bar having its central portion curved upwardly, as clearly shown at 5 in Fig. 3, so as to form a simply-arranged socket or recess in the under side of said cross-bar adapted to receive and fit over the upper part of said top brace-bar 4 of the bicycle-frame. The opposite ends 6 of the cross-bar are extended out horizontally on each side of the brace-bar 4, and on them fit collars or sleeves 7, having their inner sides formed to fit against the opposite surfaces of the brace-bar 4, and having notches in their upper faces to permit the passage through them of the curved central portion 5 of said cross-bar.

Each collar or sleeve 7 has integrally formed on its outer end a disk-like enlargement 8, forming one part of a casing wherein is held a supporting-arm, as will be hereinafter explained, and the disks 8 are arranged at angles to each other, being farther apart at their lower portions than at their upper portions, as clearly shown in Fig. 2, so that the supporting-arms held in said casings will stand at angles to each other with their lower ends engaging the ground at opposite sides of the frame. Each disk 8 is provided with a thickened central portion of circular form, as indicated at 10 in the drawings, and said thickened portions are provided with central recesses 9, the bottoms of which are made to extend at right angles to the length of the collars or sleeves 7, and said recesses 9 are adapted to receive nuts 11, screwing on the outer threaded portions of the ends 6 of the cross-bar. In this way, as will be clearly seen, the nuts 11, when screwed up on the threaded portions of the cross-bar, serve to clamp the sleeves or collars 7 securely in place, with their inner surfaces engaging the opposite sides of the brace-bar 4 of the bicycle-frame and holding the supporting devices in place thereon.

On the thickened central portion 10 of the rear disk 8 is arranged to turn a centrally-perforated collar 12, formed at the upper end of a supporting-arm 13, the lower end of which is made tubular, as shown at the right in Fig. 2, to receive a sliding lower section 14, telescoping therein and adapted to be held adjustably thereto by means of a set-screw 15 or the like. In this way the length of the supporting-arm may be conveniently adjusted.

Each collar 12 is provided at its side opposite the arm 13 with oppositely-arranged shoulders 16, adapted to engage, when the supporting-arm is moved in opposite directions, with stop-pins or screws 17, secured in the disks 8 and extending across the faces of the collars 12 into engagement with disks 18, forming the outer sides of the casings wherein the supporting-arms are held to turn. In the inner surface of each collar 12 are formed two shoulders 19 and 19$^a$, adapted to be engaged by spring-dogs 20, secured to the thickened central portions 10 of the disks 8, so that, as will be seen, when the arms 13 are raised or lowered out of or into operative position said dogs will engage said shoulders and hold the arms in adjusted position.

To permit the dogs 20 to be conveniently operated, I provide each dog with a lateral extension 21 at its free end, as clearly shown in Fig. 5, said extension projecting outside of the casing through a slot in the disk 8, and being arranged to be engaged by one end of a latch 22, pivoted on one of the screws or bolts 17, and having its opposite end formed into a handle 24, adapted to be pressed by the fingers when it is desired to raise or lower the supporting-arm. A cross-bar 23, having bent ends secured to the bolts or screws 17, as shown at the left in Fig. 2, serves to unite the two casings wherein the arms 13 turn below the brace-bar 4 of the bicycle-frame.

From the above description it will be seen that the device is of an extremely simple and inexpensive construction and is well adapted for the purposes for which it is intended, and it will also be obvious that the invention is susceptible of considerable modification without material departure from its principles and spirit, and for this reason I do not wish to be understood as limiting myself to the precise form and arrangement of the parts herein set forth.

Having thus described my invention, I claim as new and desire to secure by Letters Patent—

1. In a bicycle-support, the combination of a cross-bar having its central portion bent to engage one side of one of the brace-bars of the bicycle-frame, sleeves carried on the end portions of said cross-bar and having their inner surfaces adapted to engage the opposite sides of the brace-bar, to hold the cross-bar in place thereon, nuts screwing on the cross-bar outside the sleeves, and supporting-arms adapted to be raised and lowered and carried at the ends of the cross-bar, substantially as set forth.

2. A bicycle-support having a cross-bar, the middle of which is provided with a bend, a sleeve fitted on each end of the cross-bar and each bearing against the bend therein, the inner end of each sleeve being concave to receive a portion of the bicycle, the outer end of each sleeve being provided with a disk fixed thereto, means by which the sleeves and their disks are secured to the cross-bar, a collar rockably carried on each disk, a supporting-arm rigid with each collar, and a spring-dog coöperating with each collar by which the collars are held at different positions, substantially as described.

3. In a bicycle-support, the combination of a cross-bar having a bend in its center, a sleeve at each end of the cross-bar each sleeve being engaged with the bend, and having its inner end concave to receive a portion of the bicycle, a disk rigidly carried by the outer end of each sleeve, supporting-arms pivotally carried by the disks, and means for holding the supporting-arms at different positions, substantially as described.

THOMAS JEFFERSON.

Witnesses:
R. F. CRAWFORD,
H. A. MILLER.